United States Patent Office 3,462,841
Patented Aug. 26, 1969

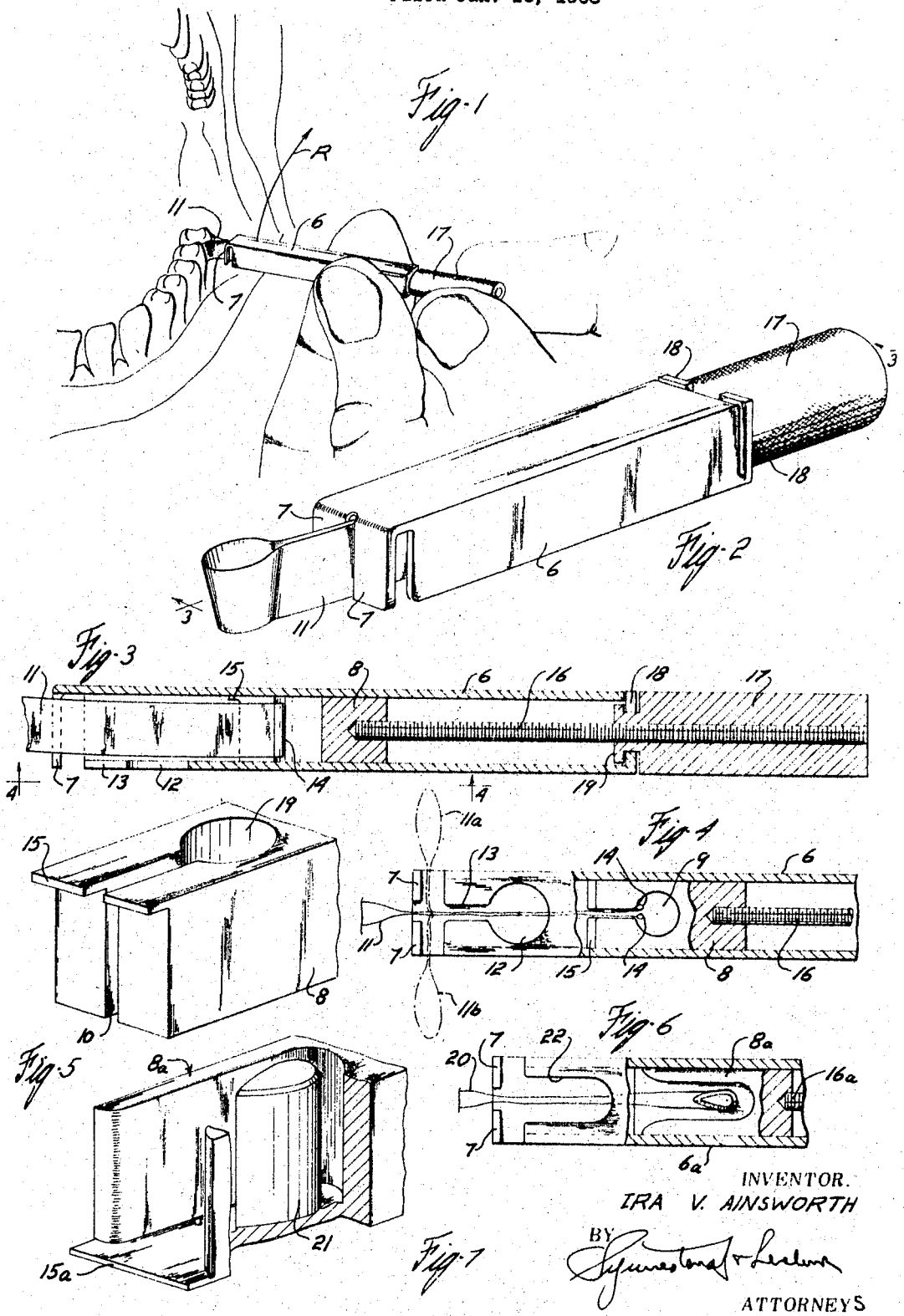

3,462,841
DENTAL MATRIX EQUIPMENT
Ira V. Ainsworth, 3009 Titanic St.,
El Paso, Tex. 79904
Continuation-in-part of application Ser. No. 654,122,
July 18, 1967. This application Jan. 16, 1968, Ser.
No. 701,810
Int. Cl. A61c 5/12
U.S. Cl. 32—63                              3 Claims

ABSTRACT OF THE DISCLOSURE

Matrix band retainer incorporating reciprocable parts for tightening and loosening a matrix band, with the reciprocable parts enclosed within a tubular body shielding or protecting the lips from contact with the reciprocable parts, and matrix band having end enlargements, or alternatively being in the form of a loop, providing for fastening of the band in the retainer.

---

The present application is a continuation in part of my application Ser. No. 654,122, filed July 18, 1967 and now abandoned.

This application relates to dental matrix equipment and is particularly concerned with a novel form of matrix retainer and also with novel forms of matrix bands.

One of the principal objects of the invention is the substantial elimination of the hazard of pinching the lips between parts of the retainer when the retainer is adjusted to tighten or loosen the band about a tooth.

Another object of the invention is to simplify the insertion of a band in the retainer and the removal of the band from the retainer and to provide a form of band and retainer not requiring the use of pinching screws or the like for the purpose of fastening the ends of the band in the retainer. The simplification of the separation of the band from the retainer is of special advantage when the retainer and the band are being removed from a tooth after a filling operation is completed.

Still another object of the invention is to substantially eliminate tendency for the band to become damaged by the fastening thereof in the retainer and to minimize unintentional unfastening of the band from the retainer.

How the foregoing objects and advantages are attained will appear more fully from the following description referring to the accompanying drawings which illustrate a preferred embodiment of the retainer and band according to the present invention, and in which:

FIGURE 1 is a view illustrating the retainer and band of the present invention in use upon one of the lower molars;

FIGURE 2 is an enlarged isometric view of the retainer, with a band projecting therefrom at the left;

FIGURE 3 is a longitudinal sectional view through the retainer, taken as indicated by the line 3—3 on FIGURE 2;

FIGURE 4 is a view partly in elevation and partly in section taken generally as indicated by the line 4—4 applied to FIGURE 3;

FIGURE 5 is an enlarged view of the band receiving block of the retainer, illustrating various details to be described;

FIGURE 6 is a view similar to FIGURE 4 but illustrating a modification in which the retainer is adapted to be used with a band in the form of a closed loop; and FIGURE 7 is a view similar to FIGURE 5 but illustrating the modification of FIGURE 6, FIGURE 7, however, showing the band engaging block in inverted position, as compared with FIGURE 5, and further having a portion broken out so as to show the means employed for fastening the band in the retainer.

In the following description, the first embodiment as shown in FIGURES 1–5 inclusive is first described in full, and thereafter the modification of FIGURES 6 and 7 is described.

As shown in FIGURES 1 to 5 of the drawings, the retainer comprises a tubular body 6. This body 6 is desirably of angular cross section, preferably square cross section, and has at one end (toward the left in FIGURES 2, 3 and 4) a pair of bent tabs 7—7 which are formed from one of the flat sides of the body.

Received in the body 6 is a block 8, this block being guided and reciprocable within the body. It should be noted that the interior cavity of the body and the exterior of the block 8 are cross sectionally shaped so as to interfit and prevent relative rotation of the block and the tubular body about the longitudinal axis thereof.

As best seen in FIGURES 4 and 5, the block 8 is provided with a cavity 9 and a slot 10 communicating with the cavity 9 and extended through one end of the block in order to receive the ends of a matrix band, such as the band indicated at 11. When the block 8 is moved to a position adjacent to the end of the tubular body 6 (the left end as viewed in FIGURES 3 and 4) the cavity 9 and the slot 10 come into registry with an aperture 12 and a slot 13 formed in one of the flat walls of the tubular body 6. With the parts in this position, the ends of the matrix band may readily be inserted edgewise through the aperture 12 and slot 13 of the body into the cavity 9 and the slot 10 of the block.

During this insertion of the band, intermediate portions of the band enter the slot between the tab or guide elements 7—7.

As clearly shown in FIGURE 4, the ends of the band 11 are provided with enlargements 14 which are received within the cavity 9. These enlargements desirably extend throughout the width of the band along the end edges thereof. The enlargements 14 serve as abutments which are "trapped," so to speak, within the cavity 9 and which therefore provide for pulling on the ends of the band in order to tighten the loop of the band around the tooth, for instance in the manner illustrated in FIGURE 1. Desirably the width of the slot 10 in the block 8 and the size of the enlargements 14 are such that when the ends of the bands are inserted, they may not be pulled out endwise through the slot in the block, but may only be removed again edgewise when the block is again returned to the position bringing the cavity 9 and the slot 10 into registry with the aperture 12 and the slot 13.

Attention is now called to the fact that the tabs or guide elements 7—7 not only provide a threading space therebetween to receive a loop of the band projecting at the end of the retainer, but further that the guide elements 7—7 are also spaced from the side walls of the tubular body in order to provide for threading of the band with a loop projecting at one side or the other of the retainer, as indicated in dotted lines at 11a and 11b in FIGURE 4. Because of this provision, the retainer may be employed in any of a wide variety of positions in the mouth and may in fact be applied to any tooth as required.

As clearly seen in FIGURE 5, the block 8 is provided with flat lips 15 projecting from the end of the block at opposite sides of the slot 10 and serving as an abutment adapted to engage the tabs 7—7 adjacent the base end thereof, thereby limiting motion of the block toward the end of the tubular body and thus always insure that clearance will be provided for lateral threading of the matrix band in the positions indicated at 11a and 11b.

Reciprocation of the block 8 within the tubular body 6 is effected by means of a screw 16 which is fastened to the block, preferably being secured as against rotation and also as against axial displacement with respect to the block. This screw extends from the block toward the end of the tubular body opposite to the end from which the matrix band projects, and an internally threaded and externally knurled nut 17 cooperates with the screw. As best seen in FIGURES 2 and 3, a pair of tabs 18 bent from one of the flat sides of the tubular body 6 and lying in a plane transverse to the axis of the body cooperate with a groove formed between the main body of the nut 17 and the inner reduced end portion 19 thereof. This construction provides freedom for rotation of the nut 17 but restrains the nut as against movement axially of the tubular body. In consequence of this and since the block 8 is prevented from rotating in the body 6, rotation of the nut 17 causes the screw 16 and thus the block 8 to move in one direction or the other within the tubular body 6.

Although the tubular body may have an angular cross section other than the square shape shown, or may even be of circular cross section, the angular shape has certain advantages including the fact that rotation of the block may be prevented merely by employing a block of angular cross section generally conforming with the interior of the tubular body. In addition, the employment of an angular body, especially a squared body such as shown, greatly facilitates fabrication of the retainer. Indeed the main body of the retainer may readily be formed of square tubing, certain side wall portions thereof being cut and bent to provide the guide elements 7—7 and the parts 18—18 for mounting the nut 17.

Because of the foregoing and other structural features, the device as a whole is of exceedingly simple construction, requiring fabrication, assembly, etc. of a minimum of parts, while at the same time, providing an instrument having a broad range of uses in connection with matrix bands.

In considering the use of the band and retainer of the present invention, it is first pointed out that many of the matrix bands commonly employed are somewhat curved in the mid region thereof so that upon tightening of the central loop of the band around a tooth, the tooth encircling loop assumes a somewhat conical shape. This configuration is used because a tooth is ordinarily of somewhat smaller diameter near the gum as compared to the region near to the biting surface.

Preferably, when the band and retainer are assembled, for instance as illustrated in FIGURE 2, the band is positioned so that the smaller edge of the tooth encircling loop will be presented gingivally. This is desirable, because after the band has been used in the performance of a filling operation and it is desired to remove the band and retainer, the knurled nut 17 is loosened until the block 8 is shifted to bring the cavity 9 and the slot 10 into registry with the aperture 12 and the slot 13. With the parts in this position, the retainer may then readily be separated from the ends of the band by an occlusally arcing movement of the retainer, for instance in the direction indicated by the arrow R in FIGURE 1. Thereafter the band may be removed occlusio-lingually from the tooth. This represents a greatly simplified technique for separation of the retainer and the band, as compared with the requirements of various prior art devices in which pinch screws or the like are employed to fasten the band in the retainer. In use of the retainer on a tooth of the upper jaw, the position will be inverted as compared with FIGURE 2.

The matrix bands employed with the retainer of FIGURES 1 to 5 may be of various different shapes in the region intermediate the ends thereof as is known, but according to this embodiment of the invention the bands employed preferably are provided with end enlargements as above described, and such bands, together with the provision of the cavities and slots enabling edgewise insertion and removal of the ends of the bands in the retainer, greatly simplified band insertion and removal, and simplifies the fastening of the bands in the retainer. Moreover, because of the elimination of fastening or pinching screws or the like, as have been customary with many prior matrix band retainers, the bands themselves are much less subject to damage and breakage.

The foregoing structural features of the embodiment of the band and retainer of FIGURES 1 to 5 afford still another important advantage. Since the bands are much less subject to damage, it is practical to employ bands formed of certain resilient and readily deformable materials, such as rubber, and certain resins or plastics, for instance polyvinyl chloride or polyvinyl fluoride. The characteristics of such materials are desirable in matrix bands because, in contrast to metal bands, the bands made of yielding material give and conform to the vagaries of tooth shape. However, it has not generally been practical to use bands of deformable material with most retainers because the band fasteners tend to damage or break the ends of the bands. When employing bands of yielding or deformable materials, the materials are preferably molded to provide the end enlargements, the enlargements preferably being molded so as to project toward both sides of the mean plane of the band at the ends thereof.

Because of the construction of the retainer and of the bands according to the invention, unintentional loosening or release of the fastening of the band in the retainer is virtually eliminated, regardless of whether the bands are formed of metal or deformable material.

It should be observed that all of the relatively reciprocable parts of the retainer are effectively enclosed or shielded by the tubular body, so that it is not possible to pinch the lips of the patient between the reciprocable parts. Screw threaded elements are also completely enclosed so that these parts likewise cannot cause abrasion or injury to tissues surrounding the mouth. If desired small holes may be provided in various walls of the tubular body, for instance to facilitate drainage after sterilization, but any such holes should not be so large as to permit mouth tissues to enter.

The embodiment of FIGURES 6 and 7 is adapted to be employed with a matrix band in the form of a closed loop, instead of with a matrix band such as shown in the other figures, having enlargements 14 at the ends thereof. Such a closed loop band is indicated in FIGURE 6 by the reference numeral 20. In this embodiment the block 8a which is slidable within the tubular body 6a is provided with a post 21 over which one portion of the closed loop of the retainer band may be placed when the block is moved (toward the left when viewed as in FIGURE 6) to a position in which the cutout 22 provided in the wall of the retainer body provides access to the post 21. Lip 15a serves the same function as lips 15 described above.

Upon drawing the block 8a into the retainer body (toward the right as viewed in FIGURE 6) by means of the screw 16a, the wall of the body 6a will of course prevent displacement of the retainer band so that the band will remain in engagement with the post 21.

The arrangement of FIGURES 6 and 7 provides the advantages above fully described with reference to the embodiment of FIGURES 1 to 5 and, in addition, the arrangement of FIGURES 6 and 7 affords certain additional advantages, as follows:

First, since the band does not have any free ends which are required to be brought into adjacent relationship to each other during the act of positioning the band over the post 21, the assembly of the band with the retainer may be accomplished even more readily and quickly. Also when the band and retainer are separated in the mouth, it is of advantage that no free or loose ends of springy band material are present.

The employment of a closed loop band has a further advantage in that the band automatically and readily equalizes the band tension when tightened in place, because the band may easily slide either about the tooth or about the post 21 during the tightening operation. This automatic equalization of tension further reduces danger of band breakage or damage.

The closed loop bands employed in accordance with the embodiment of FIGURES 6 and 7 may readily and very inexpensively be cut from a tube of band material, for instance a tube of stainless steel, although if desired such closed loop bands may also be formed of certain plastic materials, such as those referred to hereinabove in connection with the materials which may be employed in making the bands used in the embodiment of FIGURES 1–5.

Where desired, the closed loop bands may also be somewhat conically contoured, in which event a band cut from a tube of material may be subjected to the desired stretching, forming or belling during the process of manufacture.

Bands which are gingivally contoured may be more freely positioned about the tooth in the event of a typical cavity sites such as disto-lingual, lingual, mesio-linqual, disto-buccal and mesio-buccal. This is accomplished without reducing available circumference of band material necessary or desired to embrace a tooth.

The closed loop type of band is also of advantage over bands having ends formed with enlargements, because the closed loop form of band is more economical to manufacture.

In either of the embodiments described above, the matrix bands are much less subject to damage than in the case of prior retainer devices and this feature of the present invention contributes substantially to the capability of reusing the bands, even when they are made of certain resin materials as above referred to.

I claim:

1. A retainer for use with a dental matrix band, comprising a tubular body substantially closed except adjacent its ends, a band engaging block axially guided and slidable in the tubular body, the interior of the tubular body and the exterior of the slidable block being cross sectionally shaped to interfit and provide against relative rotation about the axis of the tubular body, an internally threaded rotative nut mounted at one end of the tubular body and restrained as against axial movement with respect to the body, a screw cooperating with said nut and fixed to the block as against rotation and also as against axial movement and thereby provide for movement of the block in the tubular body by rotation of the threaded nut, the other end of the body having a pair of spaced guide elements between which adjacent parallel side portions of a loop of a matrix band may project from the body, and the block having means for fastening a matrix band thereto independently of the screw to provide for tightening and loosening of the band around a tooth by movement of the block, said fastening means being engageable and disengageable by movement of the band transversely of the axially guided motion of the block in the tubular body and said fastening means being laterally exposed at an open end of the tubular body only when the band is loosened and being positioned inside of the closed part of the tubular body in the range of adjustment provided for tightening the band around a tooth, the band fastening means thus providing for drawing of the band between the guide elements and into the tubular body as the block moves into the body to tighten the band around a tooth.

2. A retainer as defined in claim 1 adapted for use with a matrix band in the form of a strip having enlargements at its ends, the band fastening means of the retainer comprising a cavity formed in the slidable block for receiving the enlargements at the ends of the band and with a slot extended from said cavity to the end of the block, the cavity and slot being laterally open to provide for engagement and disengagement of the band by movement thereof transversely of the axially guided motion of the block in the tubular body when the block is moved to expose the fastening means at the open end of the tubular body.

3. A retainer as defined in claim 1 adapted for use with a matrix band in the form of a closed loop, the band fastening means of the retainer comprising a post carried by the slidable block and having a free end projecting laterally to provide for engagement and disengagement of the band loop by movement thereof transversely of the axially guided motion of the block in the tubular body when the block is moved to expose the fastening means at the open end of the tubular body.

References Cited

UNITED STATES PATENTS

| | | | |
|---|---|---|---|
| 912,810 | 2/1969 | Carleton | 32—63 |
| 2,439,703 | 4/1948 | Tofflemire | 32—63 |
| 3,081,543 | 3/1963 | Schulstad | 32—63 |
| 3,237,307 | 3/1966 | Tofflemire | 32—63 |

FOREIGN PATENTS

| | | |
|---|---|---|
| 645,966 | 4/1933 | Germany. |

ROBERT PESHOCK, Primary Examiner